United States Patent [19]

Van Toever

[11] Patent Number: 5,055,186

[45] Date of Patent: Oct. 8, 1991

[54] PELLET MEDIA TO SUPPORT GROWTH OF MICROORGANISMS AND SYSTEMS FOR THE UTILIZATION OF SAME

[76] Inventor: James W. Van Toever, R.R. #2, North Wiltshire, P.E.I., C0A 1Y0, Canada

[21] Appl. No.: 299,619

[22] Filed: Jan. 23, 1989

[30] Foreign Application Priority Data

Jan. 21, 1988 [CA] Canada ................................. 557035

[51] Int. Cl.$^5$ ............................................. C02F 3/08
[52] U.S. Cl. .................................. 210/150; 210/188; 210/197; 210/205; 210/220
[58] Field of Search ............................ 210/616–618, 210/150, 151, 188, 194, 197, 205, 208, 218, 220, 291–293

[56] References Cited

U.S. PATENT DOCUMENTS

| | | | |
|---|---|---|---|
| 4,454,038 | 6/1984 | Shimodaira et al. | 210/150 |
| 4,470,906 | 9/1984 | Frydman et al. | 210/150 |
| 4,618,418 | 10/1986 | Heijnen et al. | 210/188 X |
| 4,620,931 | 11/1986 | Hirata et al. | 210/150 X |
| 4,681,685 | 7/1987 | Sutton et al. | 210/151 X |
| 4,832,848 | 5/1989 | Velebil et al. | 210/150 X |

Primary Examiner—Tom Wyse
Attorney, Agent, or Firm—Arnold, White & Durkee

[57] ABSTRACT

Disclosed are pellets for use in a fluidized bed type of system to provide optimum surface configuration and maximum effective surface area per unit volume for the culture of microorganisms. The pellets are of low density, preferably plaster, having a buoyancy relative to the liquid in which they are fluidized substantially neutral or slightly positive. The pellets preferably have indentations on its surfaces to enhance the growth of microorganisms. The pellets are manufactured by either cutting discs from an extruded filament or punching discs from sheets of the appropriate material, with indentations being formed during the process.

Also disclosed is an aquaculture apparatus and system in which the pellets are preferably used. The apparatus includes a chamber in which the pellets may be fluidized within a liquid having dissolved elements to be processed, the chamber including apparatus to create fluidization of pellets within the chamber to induce movement of the liquid and pellets whereby self scouring of the pellets is achieved to limit the build up of biofilm thereon. In the preferred aspects, the apparatus and system pertains to water purification and in particular to the treatment of a dissolved toxic waste in an aquaculture system to non-toxic forms through the fluidization of the pellets containing biogrowth thereon. The fluidization is induced by an air bubble wash of the sides of the chamber, the air also aerating the liquid for return to a fish culture tank.

26 Claims, 6 Drawing Sheets

PELLET MEDIA TO SUPPORT GROWTH OF MICROORGANISMS AND SYSTEMS FOR THE UTILIZATION OF SAME

FIELD OF THE INVENTION

The invention relates to the provision of pellets for use in a fluidized bed type of system to provide optimum surface configuration and maximum effective surface area per unit volume for the culture of microscopic organisms. The invention further relates to a method of manufacturing such pellets and systems in which such pellets are used in the culture of microorganisms utilizing the fluidization of the pellets. More specifically, a preferred system is disclosed for the use of such pellets in an aquaculture system wherein the pellets are fluidized in such manner to promote the growth of microorganisms which will convert dissolved toxic wastes in culture water to non-toxic materials, that is, filter dissolved wastes from the culture water, and permit the culture water to be reused with a minimum expenditure of energy.

BACKGROUND OF THE INVENTION

Biochemical treatment of polluted water to remove soluble organic material, nitrogen, phosphorus and the like has become of particular interest, and particularly with treatment utilizing the action of microorganisms. One aspect in particular is the biofilm process where microorganisms are adhered to the surface of a solid and the microorganisms decompose pollutants such as nitrogen in the water.

Of particular interest in the biofilm process is a fluidized bed process wherein a large, effective surface area of the biofilm is required.

In most processes involving the culture of microorganisms, there is a desire to provide as much effective surface area on which microorganisms can grow per unit volume of culture medium as possible, with the confines of an overall cost effective filter system.

Although this invention in its broadest scope is not limited to aquaculture systems, applicant sets out its invention, both for the background of the invention and preferred embodiments, exemplifying aquaculture systems.

Aquaculture, the culture of organisms such as fish in water, requires good quality water in large quantities. In view of the diminishing availability of appropriate natural sites, increasingly stringent effluent control regulations, and the need for cost effective controlled environments to optimize year round growth, water re-use technology is becoming increasingly recognized as essential to aquaculture systems.

In all water re-use systems, it is essential that solid wastes and dissolved wastes be removed and that oxygen utilized by the fish and bacterial growth be replenished.

Nitrifying bacteria cultured in filter beds are traditionally used in re-use systems to effectively remove potentially toxic ammonia by converting it to nitrate. The bacteria require well oxygenated water and a surface to grow on in addition to the ammonia in the water. Bacteria filters normally consist simply of inert material such as stone or gravel or plastic media which provide high surface area per unit volume for bacterial growth.

The key to high efficiency biofilter design is to incorporate as much effective surface area per unit volume as possible. To date, most biofilters have been quite bulky and relatively inefficient. The technologies primarily used to date have been based on municipal water purification systems. For example, a bed of gravel, which has a large particle surface area, is installed in a tank and waste-water is flushed through the bed. Bacteria will grow on the surfaces of the gravel particles but after a time a combination of the growing bacterial film and unfiltered solid waste particulates clogs the pores between the gravel particles. Short circuiting of the flow of water—that is, channelling of the flow, takes place and a large volume of the bed becomes inactive. Also, anaerobic conditions develop, that is, conditions of low oxygen and the generation of potentially toxic wastes. Accordingly, these types of systems require substantial maintenance including stirring and backwashing in order to clean the gravel filters on a regular basis.

In an attempt to remedy the above problem in commercial sewage treatment systems, moulded plastic shapes of various configurations, relatively large compared to the size of gravel particles, are installed in bulk in large tanks. The plastic shapes are designed with a lot of voids or spaces in them thereby creating a static bed with channels large enough that even with the accumulating growth of a biological film, there is not the tendency for clogging as in a gravel bed. The plastic media are a compromise between the need to maximize surface area per unit volume and the requirement for a relatively low maintenance system. Nevertheless, with this system, problems eventually occur with short circuiting and the development of anaerobic areas necessitating periodic flushing and cleansing maintenance of the filter.

Recently, there is increasing interest in fluidized bed biofilters wherein very fine particles, providing a large surface area for the growth of bacteria, are kept in motion so that there is not a gradual build up of a large amount of biofilm on the particles. Because the particles are in motion, there is a tendency for them to self-scour, thus providing an optimal thin, active aerobic biofilm on each particle. In theory, this type of system is ideal because every potential (particle) surface in the filter is covered with a good quality bacterial growth and the scouring action abrades any excess biofilm growth off the surfaces. High density sand particles, kept in motion and suspension by high pressure water jets, have been used effectively in these systems. However, such systems take a substantial amount of energy to operate.

Further, to date technologies used for water re-use in aquaculture systems have primarily been centralized filter designs where one large unit is custom engineered to serve an entire facility. Generally the designs have been similar to those used for municipal sewage treatment and they are not appropriate for commercial aquaculture systems. More particularly, in centralized systems, all water from each fish culture tank must be pumped to a central filter and returned to each individual tank. This requires a substantial amount of energy for pumping and expensive pipes, valves and controls. Further, because the water from all tanks is combined for processing, there is a risk of spreading disease from one infected tank to all other tanks. Moreover, hatcheries are generally designed for a given production rate and the central filter plant is scaled accordingly. It is therefore difficult to expand without considerable expense in replicating the central treatment or filter plant. Central treatment plants are not off the shelf technology and therefore involve costly engineering. Further, because solid wastes from each fish tank are transported to the central plant, they are broken down and stirred into the cultured water as they travel at relatively high velocity in the pipes. Provision for settling out or filtering out the wastes must be provided. Because the solid wastes are held in the circuit of the filtration system for some time, a considerable amount of secondary decomposition of the solid wastes occurs generating dissolved wastes which in turn must be filtered out. Ideally solid wastes are removed instantaneously so they do not decompose. This is difficult with a centralized design.

Accordingly, with respect to the above description pertaining to aquaculture, it will be appreciated that there is a desire to provide a system which is of the fluidized bed type but which is much less energy demanding and a system which is susceptible to a modular design enabling each tank to be outfitted with a low cost biofilter system, whether such tank is part of a new system or whether it is part of an existing system being retrofitted.

However, it should not, as previously noted, be assumed that applicant's invention is limited in its broader aspects solely to aquaculture systems. Aspects of the invention pertain to the provision of pellets for use in a fluidized bed type of system to provide optimum surface configuration and maximum surface area per unit volume for the culture of microscopic organisms. Applicant's pellets and the fluidized system are adaptable for use in non-aquaculture systems such as in other water purification systems and in chemical, biological and fermentation systems. Applicant's invention is directed to providing an environment for promoting the growth of microorganisms, i.e. providing maximum effective surface area per unit volume for microorganism growth on an ongoing basis. Accordingly aspects of the invention should be adaptable for example to the anaerobic production of methane gas, using methane as a fluidizing gas or in a fermentation process for the production of alcohols using carbon dioxode as the fluidizing gas.

It is also to be noted that in those prior art systems that have used fluidized particles wherein the particles of a density greater than 1.1 and granular in size, it is difficult to have a cost effective system with favourable height to width ratio, such systems requiring a significant height in order to maintain the granular particles within the fluidized bed system. Otherwise systems for separating the granular particles which flow out of the fluidized bed system with the outlet flow or effluent is required.

Accordingly, although some fluidized bed systems may use smaller particles, such systems are not cost-effectively usable, because of unfavourable height-to-width ratios in a system virtually within tanks of the water to be treated such as aquaculture tanks.

SUMMARY OF THE INVENTION

In one aspect, the invention broadly pertains to a pellet for use in a fluidized bed type of system to provide optimum surface configuration and maximum effective surface area per unit volume for the culture of microscopic organisms. The pellet comprises a small disc of a material having a sufficient degree of buoyancy relative to a liquid containing dissolved elements to be processed such that the disc can readily be moved within a volume of the liquid by movement of the liquid with minimum energy. Movement of the liquid may be through agitation or circulation of the liquid or preferably induced by the flow of gas bubbles through the liquid. In a preferred embodiment, at least one of the surfaces of the disc includes indentations and the disc has substantially neutral or slightly positive buoyancy relative to the liquid and is of low density plastic.

In another aspect of the invention, there is provided a method of manufacture of pellets comprising the steps of forming suitable material into a configuration having at least one dimension substantially corresponding to a dimension of a finished pellet, and forming disc from the formed configuration. One of the forming steps including forming a plurality of surface indentations on the material.

More preferably, the pellets may be manufactured by extruding a filament of suitable material and slicing discs from the filament. The discs are then directed through a roller mill adapted to form a plurality of surface indentations on at least one side thereof. An alternate method of manufacture of the pellets comprises forming a sheet of suitable material, forming surface indentations on at least one side of the sheet of material, and cutting the discs from the sheet with the surface indentations thereon.

The invention also comprehends apparatus for use in association with a system involved in the processing of liquid having dissolved elements with microorganism culture and utilizing the fluidization of pellets. The apparatus broadly comprehends wall means defining a processing chamber for the fluidization of pellets with microorganism growth thereon used in processing a liquid with dissolved elements, the wall means including a bottom and side wall means, and the chamber including first means for permitting introduction of the liquid to the chamber. Means adjacent the bottom of the chamber provide for a fluidizing wash of the side wall means sufficient to cause fluidization of pellets used in the system within the chamber, and the chamber includes second means for removing processed liquid therefrom. Preferably the first means includes duct means to direct liquid to be processed to the top of the chamber and the second means includes a processed liquid outlet manifold adjacent the bottom of the chamber, the second means including means preventing clogging of the outlet manifold by pellets used in the system. The side wall wash providing means may comprise a gas bubble manifold adjacent the periphery of the bottom of the chamber with the clogging preventing means including gas bubble generating means associated with the outlet manifold. The second means for withdrawing processed liquid from the chamber preferably includes air lift pump means associated with the outlet manifold.

A still further aspect of the invention comprehends a system for use in association with a liquid purification system including a tank having walls and containing a liquid having dissolved wastes. The system comprises side wall means and a bottom wall defining a treating chamber with first flow communication means between the tank and the chamber for conveying liquid to be treated from the tank to the chamber. Means in the chamber provide a bubble wash of the side wall means of the chamber and there are pellet means within the chamber. The pellet means are adapted to fluidized motion within the chamber through movement of liquid and the bubble wash, the pellets being constructed such as to allow growth of a bacterial film capable of converting toxic dissolved wastes in the chamber into nontoxic forms. Second flow communications means is between the chamber and the tank for conveying treated liquid from the chamber to the tank.

A preferred aspect of the system comprehends the first flow communication means including duct means for conveying liquid containing a relatively high concentration of dissolved wastes from the tank to the top of the chamber. The means for providing a bubble wash of the side wall means of the chamber would comprise a gas bubble manifold contiguous with the bottom wall and side wall means of the chamber and having aperture means to provide an upwardly moving bubble wash of the wall means when the gas exits from the apertures. The second flow communication means may include an outlet manifold adjacent the bottom of the chamber for removing treated liquid therefrom, the outlet manifold being constructed and located within the chamber whereby pellets do not interfere with movement of water from the chamber into the outlet manifold. A conduit from the outlet manifold to a spraybar associated with the top of the tank in association with air lift pump means pumps treated water from the outlet manifold to the tank.

The invention still further contemplates a method of processing a liquid containing dissolved elements with cultured microorganisms, comprising; providing a processing chamber having side wall means and containing a plurality of pellets, conveying the liquid containing dissolved elements to the chamber, providing a wash of the chamber side wall means sufficient to cause movement of the liquid and effective fluidization of the pellets, and withdrawing processed liquid from the chamber. Preferably the liquid to be processed is introduced adjacent the top of the chamber and the processed liquid is withdrawn from adjacent the bottom of the chamber through a screened outlet manifold. Suitable means are provided to prevent clogging of the screened outlet manifold by pellets. The fluidizing wash of the chamber side wall means may be by a gas bubble wash and the clogging preventing of the screened outlet manifold is also preferably by gas bubble flow. The chamber may be associated with a tank containing liquid to be biofiltered, the liquid to be treated being conveyed to the top of the chamber for treatment, and the withdrawal of treated liquid from the bottom of the chamber including an air lift pump to pump liquid to the top of the tank.

A preferred aspect of the invention contemplates a water treatment system wherein dissolved wastes are removed from water and solid wastes are removed separately. A treatment chamber is associated with the tank and contains water and a plurality of pellets therein, which pellets are such as to permit biofilm growth thereon. Means are provided for conveying water to be filtered from the tank to the chamber and means are provided for fluidizing the pellets and aerating the water in the chamber whereby biofilm formed on the pellets is in growth effective contact with water and air in the chamber. Means are provided for withdrawing treated water from the chamber, and means provide for selectively flushing solid wastes from the tank. Make-up water may be introduced to the system to compensate for water loss due to the flushing. The system is adapted to treat cultured water in an aquaculture system, the means for conveying water to the chamber including means for covneying water from the tank at a location having a high concentration of dissolved wastes to the top of the chamber. The means for withdrawing treated water includes means for removing treated water from the bottom of the chamber and conveying it to the top of the tank.

A particularly preferred filter device according to this invention is one wherein there is an annular baffle supported within a chamber, concentric therewith and cooperating with the chamber to define a vertical circulatory flow path for fluidized pellets, fluidization of the pellets being effected by fluid (such as air) injected into the bottom of the annular baffle. A screened cone-shaped outlet manifold is within the upper portion of the baffle and pellets impacting on the screen scour the screen to keep biofilm from building up thereon as well as cause the media pellets to further scour themselves. The shape of the screened manifold prevents pellets from adhering to the manifold and restricting the outlet flow of beaded fluid.

Other aspects of the present invention will be apparent to those skilled in the art from the detailed description and claims to follow when read in conjunction with the accompanying drawings.

DESCRIPTION OF PREFERRED EMBODIMENTS

Figures 1, 2, 3, 4, 5A:
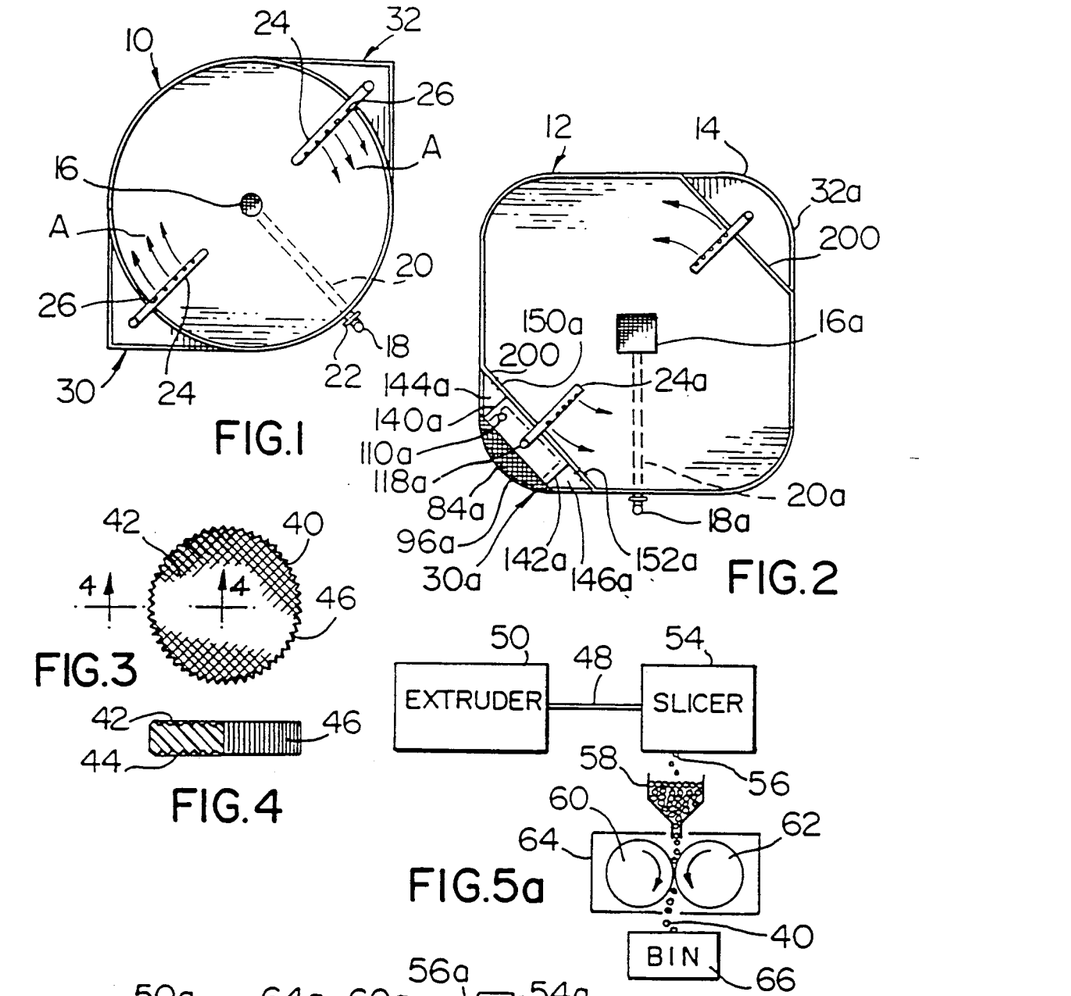
FIG. 1 is a plan view of a circular aquaculture tank showing aspects of the invention.
FIG. 2 is a plan view of a "Swede" style aquaculture tank.
FIG. 3 is a plan view of a biofilter pellet.
FIG. 4 is a part sectional view of the pellet of FIG. 3 taken along line 4—4.
FIG. 5a is a schematic view of a manner of manufacture of the pellet.

FIGS. 1 and 2 show two fish culture tanks 10 and 12. Although fish can be grown in virtually any type of tank, the design must, to be commercially viable, be optimized for cost, manageability and productivity. Of the basic fish tank configurations used in the industry for culture of salmonids, the basic shallow circular tank shown in FIG. 1 has the best combination of uniform water quality, cost effectiveness, and manageability. Tank 10 is such a basic tank configuration.

The "Swedish" style square tank, tank 12 in FIG. 2, with internal rounded corners 14 is also a widely used and successful configuration. This style provides more culture space per unit of floor space which is particularly important when used indoors where space is costly. The square configuration however, does compromise somewhat the hydraulics of the tank, especially when a small radius of curvature is used in the corners 14.

The invention has utility with either shape of tank 10 or 12 and indeed can easily be adapted, as will become apparent herein, to fish culture tanks of any configuration.

However, for the purposes of describing and illustrating the invention further, reference will primarily be made to a circular tank, such as tank 10. It should be noted however, that for the purposes of clarity, details about structure to support the tanks and various components has been omitted as they do not form features of the invention.

Tank 10, which can be made of any suitable material such as plastic, fiberglass or metal, includes a central screened drain 16 with conventional, external standpipe overflow and level control 18 in flow communication with drain 16 via pipe 20. There is a coupling 22 between pipes 18 and 20 which permits selective rotation of pipe 18 from a generally vertical position (as shown) to a non-vertical position (towards the horizontal) and this permits the pressure head in the tank to flush out drain 16 and pipes 18 and 20 as well as control the level of water in tank 10. The conventional drain system to which solid wastes and water is dumped from pipe 18 is not shown and forms no part of this invention.

Spraybar outlet 24 has a closed outer end and a series of holes or nozzles 26 through which filtered water (arrows A) is returned to tank 10 from biofilter systems 30 and 32. It is conventional that spraybars be constructed such as with coupling 38 so that the end portion of the bar may be selectively rotated at least 90° thereby enabling the direction of spray water, relative to the water in tank 10, to be controlled. The direction of outlet spray is used to control the speed of rotation of the water in tank 10.

Tank 10 has two diametrically opposed, identically constructed, biofilter systems 30 and 32. Only one filter system 30 need therefore be described in detail.

The biofilter system 30 of the invention is of the fluidized bed type in that small particles or pellets are used on which the biofilm may grow. The pellets are constantly kept in motion. However, unlike high density particles such as sand, low density pellets, which are substantially neutrally buoyant, are used. Actually, the preferred pellets are slightly positively buoyant so that when the system that is used to keep them in motion is turned off and there is no agitation, the pellets float just at or under the surface of the water in the filter chamber. As will become apparent herein, only a small amount of aeration is required to set up sufficient turbulence in the water and to stir the water that the pellets are dragged down into the water and evenly mixed through the filter chamber.

FIGS. 3, 4, 5a and 5b illustrate a preferred biofilter pellet and manner of manufacture.

The biofilter pellet 40 is preferably a substantially neutrally buoyant particle, e.g. one having a density or specific gravity of from about 0.9–1.0 of a plastic material such as high density polyethylene shaped into a disc about $\frac{1}{8}$ to $\frac{3}{8}$" in diameter and 0.05–0.125 inches in thickness, although these dimensions are by way of example only. Preferably the pellets are about $\frac{1}{4}$" diameter and 1/10" thickness. The pellet has upper and lower knurled surfaces 42 and 44 and peripheral niches or recesses 46.

FIG. 5a schematically illustrates a manufacture of the pellets 40. Plastic material is extruded into continuous bars or filaments 48 from extruder 50 with a die providing for peripheral niches 46. The bars or filaments 48 are cut or sliced into pellets 56 by slicer 54. The pellets 56 are deposited in bin 58 and fed into the nip of two adjacent steel pressure rollers 60 and 62 of mill 64. Rollers 60 and 62 have knurled surfaces to provide for the knurled surfaces 42 and 44. The finished pellets 40 are deposited into storage bin 66.

It will be appreciated that the extruding and slicing equipment capable of forming the pellets 40 is known and accordingly detailing the specific features of this equipment is not considered necessary. Pre-extruded and pre-cut or sliced pellets can be utilized in mill 64.

Figure 5B:
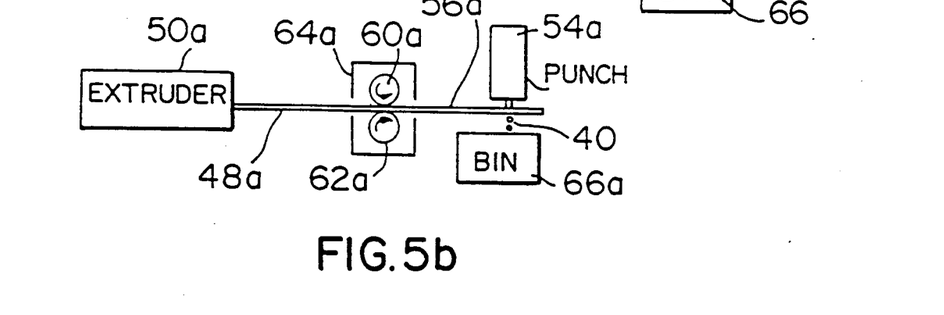
FIG. 5b is a schematic view of another manner of manufacture of the pellet.

FIG. 5b schematically illustrates an alternate method of manufacture of pellets 40. Plastic material is extruded into a continuous sheet 48a approximately 1/16" in thickness and of width appropriate to roller mill 64a and punching machine 54a. The sheet 48a is fed between to adjacent pressure rollers 60a and 62a. Rollers 60a and 62a have knurled surfaces to provide for the knurled surfaces 42 and 44. The knurled sheet 56a is then passed through punching machine 54a where finished pellets 40 are individually punched with punch dies configured to produce indented pellet peripheral niches 46. The finished pellets 40 are deposited in storage bin 66a.

Various other shapes of pellets are possible but applicant has found that the disc shaped pellets formed to provide knurled side surfaces and peripheral niches, that is, surface indentations, are most effective for a biofilter. Although pellets 40 without surface indentations will work, there is a tendency that too much scouring takes place as a result of the turbulence and agitation and the biofilm does not build up adequately on smooth surfaces. The surface indentations of pellets 40, provide micro-shelters or niches so that there are many more areas where bacteria can grow, protected from the scouring action. Various shapes of indentations are possible but the knurled effect is an easy pattern to machine on rollers 60, 62 and 60a, 62a.

The pellets 40 can be compared to a micro-waffle with relatively deep indentations in the form of tiny pockets or pits. When viewed under a microscope after use, one notes very good biofilm growth in the pockets or pits. There is actually enough shelter that multicellular organisms can flourish in the pockets undisturbed by the turbulence and agitation the pellets are subjected to.

Figure 6:
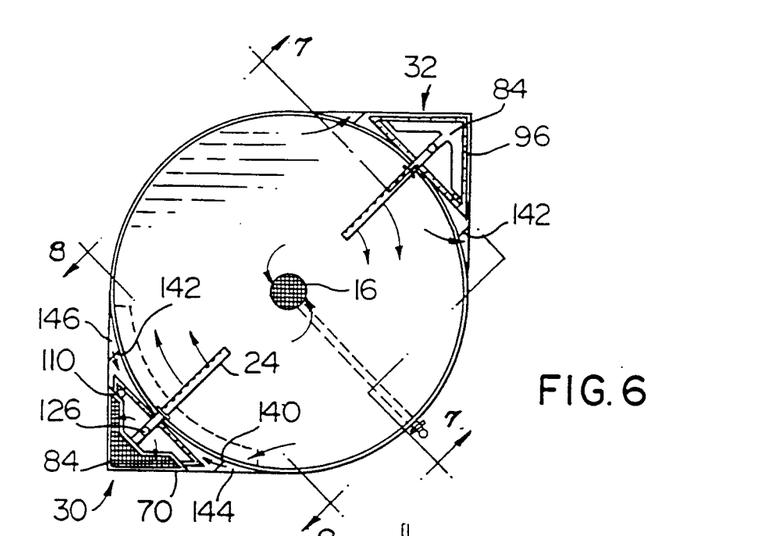
FIG. 6 is a plan view of a circular tank showing in further detail the biofilter system.
Figure 7:
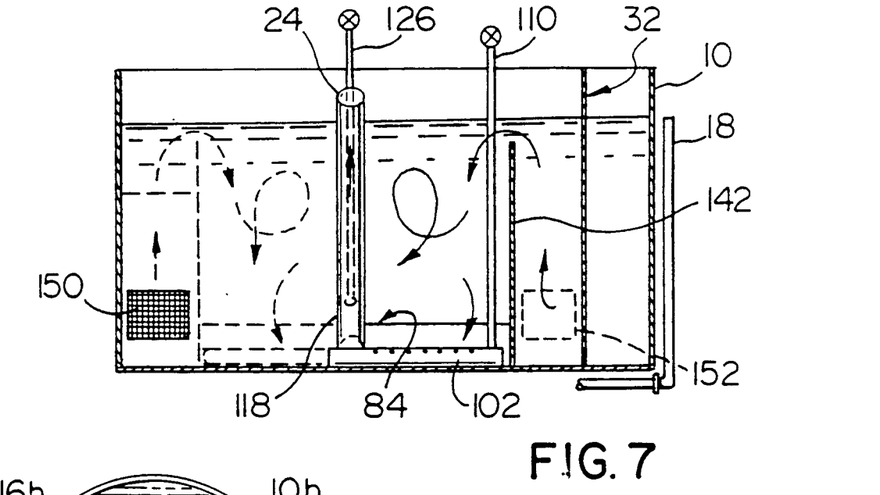
FIG. 7 is a schematic elevational view taken along line 7—7 of FIG. 6.
Figure 8:
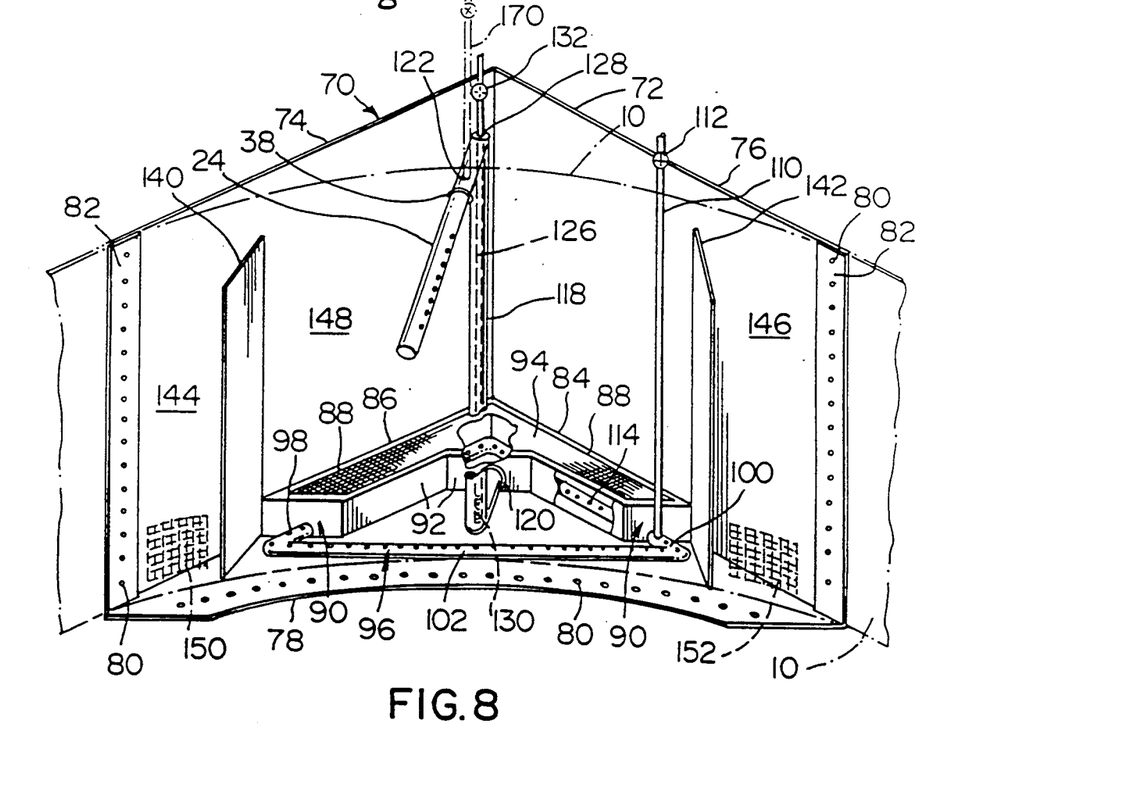
FIG. 8 is a sectional view taken along line 8—8 of FIG. 6.

Turning now to FIGS. 6–8, applicant has developed a biofilter system 30 in which the use of the plastic, biofilter pellets 40 is particularly effective.

Filter system 30 includes filter tank 70 formed by a shell 72 of molded, plastic, fiberglass or other suitable material secured to a side and bottom of fish tank 10. The sides 74 and 76 and bottom 78 of shell 72 are at right angles to each other and are suitable for bolting or riveting through holes 80 (FIG. 8) to tank 10, the outline of which is shown in dotted lines. Appropriate seal means 82 along the sides and bottom between shell 72 and tank 10 provide a watertight filter tank 70 which utilizes part of the outer surface of tank 10 as a side wall. Shell 72 has a height similar to the height of fish tank 10.

In the bottom corner of filter tank 70 is a filtered water outlet manifold 84 having outer walls 86 and 88 adjacent sides 74 and 76 of shell 72. Manifold 84 is closed inwardly by end walls 90 and is of triangular configuration having central, walled recess portion 92 in the hypotenuse side thereof. Manifold 84 is secured by any suitable means to the bottom corner of shell 72. To top lip 88 of manifold 84 is secured screen means 94 having a suitable mesh so that pellets 40 are prevented from entering manifold 84. The screen is shown removed from filter system 32 in FIG. 6.

Air bubble ring manifold 96 has two side conduit portions 98 and 100 extending into manifold 84 and lying inwardly of the outer side walls 86 and 88 thereof (and inwardly of the side walls of shell 72). Third conduit portion 102 is in air flow communication with side conduit portions 98 and 100 to complete air bubble manifold 96 Conduit 100 is in air flow communication with vertical air inlet pipe 110. Valve 112 is provided to control air flow to air bubble manifold 96 from a central source (not shown). Bubble manifold 96 has spaced holes 114 on the upper side of the conduit portions to allow air to escape. By way of example, these holes are roughly 1/16" diameter on 2" centers. Although air inlet pipe 110 is shown in flow connection with conduit 100, it will be appreciated that the connection can be made at any point in bubble manifold 96. Different locations of connection may be preferred in order to maintain as uniform pressure within the manifold 96 as possible.

Extending outwardly and upwardly from filtered water manifold 84 within recess portion 92 is filtered water conduit 118. Conduit 118 has one end sealingly secured by appropriate flange means 120 to manifold 84. The other end 122 of conduit 118 is connected to spray bar 24. Extending downwardly, coaxial with the vertical portion of conduit 118 is air conduit 128 which is sealed by suitable sealing means at 128 with the upper elbow of conduit 118. Air conduit 126 stops short of the bottom of vertical portion of conduit 118 and may have an air diffuser 130 associated therewith. Air is simply directed horizontal and/or upwardly from the bottom of conduit 126. As an alternative, air conduit 126 could run down the outside of water conduit 118 and enter through side thereof at the appropriate level. Air diffuser 130 is optional.

Water conduit 118 and air pipe 126 provide an air lift pump which raises water upwardly in conduit 118 and out spraybar 24 from within manifold 84. Air conduit 126 has valve 132 to control the flow of air to the air lift pump. The source of air (not shown) may be the same as that for air bubble manifold 96, however the flow of air would be individually varied by the respective valves 112 and 132 as appropriate for the functions of the components.

Within tank 70 are partitions 140 and 142 which extend from side walls 74 and 76 of shell 72 to the exterior wall of tank 10 and upwardly from shell bottom 78. Partitions 140 and 142 are secured by any suitable means to the respective walls and bottom to provide chambers 144 and 146 separate from biofilter chamber 148 which contains manifold 84. Partitions 140 and 142 extend upwardly, short of the top of tank 10 or shell 72 for reasons which will become more apparent herein.

Screened, unfiltered water outlets 150, 152, shown in FIG. 8 in dotted lines, are cut or fabricated in the side wall of tank 10 adjacent the bottom thereof which outlets enable water in tank 10 adjacent the bottom thereof to flow into partitioned chambers or ducts 144 and 146, upwardly within these chambers or ducts, over the top of the respective partitions 140, 142 and into filter chamber 148. Although not shown, screens could be placed above the tops of partitions 140, 142.

Screened filter inlets 150 and 152 are preferably located approximately 6" above the bottom of tank 10. This ensures water of lower quality nearer the tank bottom is drawn into the filter. These solid waste which settle to the bottom of the tank are not drawn into the filter tank.

OPERATION

Tank 10 is filled to the appropriate level with water and stocked with fish. As screened outlets 150 and 152 are in communication with chambers of ducts 144 and 146, water also fills these chambers and flows over the tops of partitions 140, 142 into filter chamber 148. The water in chambers 144, 146 and 148 is at the same level as in tank 10 as controlled by standpipe 18. Pellets 40 are dumped into chamber 148 and when the biofilter system is not operating, the pellets having a slightly positive buoyancy will tend to float, the volume of pellets being about 50% of the volume of water in filter chamber 148, although this quantity may vary depending on the circumstances.

Air is introduced into bubble manifold 96 through air conduit 110 as regulated by valve 112. A curtain of air bubbles is caused to move upwardly from bubble manifold 96 adjacent all the associated walls of chamber 148. A bubble wash of all the side walls is set up and the movement of the bubbles upwardly along the walls, causing upward motion of the water adjacent the walls causes pellets 40 to rise along the walls to the surface of the water in filter chamber 148. The flow then folds into the center of chamber 148 because the flow is coming from all directions. There is no dead side wall, that is, all side walls are subject to the bubble wash. The pellets 40 and water flow down the center of chamber 148 to the bottom and fan out to the sides. The pellets are in a sort of vertical circular motion, namely, up the sides, folding into the center of chamber 148, down the center of chamber 148 and back to the sides. The pellets are continually moving with good aeration of the water being provided to enhance biofilm growth. Slight scouring of the pellets is caused by the turbulence and this reduces build up of unproductive biofilm on the pellets. The recesses, niches or pockets in the pellets 40 however, permit good biofilm growth.

Air through conduit 126 and diffuser 130 moves upwardly in filtered water outlet 118 and filtered water from outlet manifold 84 is moved upwardly and outwardly back to the fish tank 10 through spraybar 24. Filtered water enters manifold 84 through mesh 94 and pellets 40 are kept off mesh 94 by bubbles exiting from the mesh. Accordingly, the filter design permits good aeration of the water which promotes good biofilm growth to remove dissolved wastes such as ammonia as well as re-oxygenating the water for the fish. Further, air bubbles also permit water to be removed from the filter tank through manifold 84 and introduced back into the fish tank without pellets clogging the mesh 94 of manifold 84. As filtered water is removed from the bottom of chamber 148, unfiltered water is drawn from tank 10, up ducts or chambers 144, 146 and over the top of partitions 140 and 142. This flow of unfiltered water into chamber 148 keeps pellets from entering chambers 144 and 146.

With reference to the biofilter system, water is removed from the bottom of the tank through outlets 150-152 because clean water is generally injected at the top on the periphery of the tank (through spray head 24) and the water, with the highest waste levels and lowest oxygen levels, is on the bottom of the tank. Accordingly, it is desirable to remove water from the bottom of the tank to get water with the highest dissolved waste load going into the filters 30, 32. Therefore, screens 150 and 152 should be at the bottom of the tank. However, the filter 30 is designed so that the outlet from manifold 84, to collect the water to pump back into the tank, is at the bottom of filter chamber 148. Ducts or chambers 144 and 146 take the water from the bottom of the tank 10 to the top of the filter tank 30 before releasing it into filter chamber 148. Water flows in at the top of chamber 148 and is stirred in with all the agitated pellets 40. To get out of the filter chamber, the water must pass all the way to the bottom of the chamber 148 where it is collected in manifold 84 and pumped out by the air lift pump.

This design ensures that water does not simply short circuit the filter system 30. Water entering the filter chamber 148 stays the maximum possible time before re-entering the fish tank so it has the highest contact time with the pellets 40. Countercurrent flows are the most efficient method of exchanging gases or fluids between two different streams. Applicant's system involves re-aeration of the culture water and the provision of oxygen for the bacteria to grow effectively. Waste water coming in at the top of the chamber 148 flows down to the bottom of the chamber 148 whereas air injected at the bottom of the chamber 148 through air bubble manifold 96 rises to the surface. While the water is flowing in the opposite direction or in a countercurrent direction to the air, it is exposed to a significant quantity of air and this provides an optimal and most energy efficient way of re-aerating the water. Not only does air fluidize the pellets efficiently but the system provides also an efficient way of getting the most out of the energy put in to aerate the water The countercurrent flow of air rising through the screen and water flowing downward through the screen into the outlet manifold 84 provides additional water re-aeration. A final re-aeration process occurs in the air lift pump.

As noted previously in the background herein water, in a conventional aqua system, is taken from each individual fish tank to a central plant for treatment All the solid waste and the waste water from the bottom of the fish tank is taken out through a bottom drain screen and pipe into a floor drain and subsequently to a central point. Once the solid waste goes through the screen or is combined with all water flow in a narrow diameter pipe, the solid wastes are broken up into small particles and re-suspended in the culture water because of the high velocity of water flow. Accordingly, when the solid wastes arrive at a central plant, all those solid wastes have to be re-separated from the culture water before it can be re-used. Usually this is accomplished in a large settling tank to give enough residence time for the particles to settle out by gravity or by density differences. Alternatively a pressure sand filtration system may be set up which should be automated and is therefore very expensive. Moreover, because the solid wastes are held in the circuit of the system, i.e. in the settling tank or the filter for some time, they break down quite rapidly. Within a short time, there is significant bacterial action on those solid wastes and the bacterial action causes the generation of additional dissolved waste in the culture water. If the waste is left for a significant amount of time in the water, the amount of secondary dissolved waste generated from the solid waste decomposition can be equivalent to the dissolved waste directly generated by the fish. Therefore, the filter requirements may be greatly increased in a centralized system.

In the present system, applicant provides an effective way of using the fish tank 10 itself to remove solid wastes. A continuous flow of water through drain 16 is not required to cause solid wastes to be removed from tank 10. Simply by setting up a rotational water flow in tank 10, solid wastes, which settle to the bottom of tank 10, are swept to the center and fall through drain 16 even when there is little flow of water out of the tank 10. The movement of the solids in tank 10 is more a function of the circular flow pattern in the tank rather than the throughput of water through the tank drain 16. Accordingly, with applicant's system, it is no longer necessary to remove all the water flow out of the bottom of the tank 10 and deal with the suspended solid problem that results. Applicant's system involves a partition flow concept. The flow is partitioned in that only a small percentage of waste water flow, about 5-10% of the overall flow, is taken out of bottom drain 16 and this is sufficient to sweep out solid wastes. The rest of the flow is taken off the side of the tank 10 and into the biofilters 30 and 32. Accordingly, most of the flow, about 90-95% of the overall flow, is recirculated and is re-aerated and filtered by the biofilter(s) 30. The waste water flow is compensated for by the addition of clean water which is provided through valve controlled pipe 170 connected preferably to a spraybar (FIG. 7) from an acceptable fresh water source (not shown). This partitioned flow enables one to use the fish tank as the settling tank without any auxiliary hardware No modification of existing tanks is necessary and all that is necessary is to periodically, e.g. twice a day, dump the standpipe 18 on the outside of the tank. Any solid wastes that accumulate in drain 16 and pipe 18 are flushed out.

Since standpipe 18 controls the overall height of water in tank 10, the provision of a pivoting joint 22 to allow standpipe 18 to be angled, will cause the head of water in tank 10 to force a small amount of water out pipe 18 taking along solid wastes to a suitable drain, not shown. Pipe 18 is returned to its vertical position and make-up water through pipe 170 will bring the system back to equilibrium. The dumped solid wastes are out of the circuit of the water filtering system and therefore do not require handling in any other way. There is no secondary decomposition in the system. Accordingly, applicant's biofilter system only has to deal with dissolved wastes such as ammonia generated directly from the fish metabolism rather than that generated by secondary decomposition of the solid waste.

With the above water re-use technology, only about 5–10% of the water flow required in a conventional flowthrough (or non-reuse) system is required in a properly managed system. The small flow required is for periodic solid waste removal and to prevent an accumulation of dissolved wastes by dilution to maintain acceptable levels. The technology for 100% water re-use has not yet been developed suitably for commercial application, however, the high rate of water re-use achievable with this system results in considerable economic advantage.

Applicant's system provides a filter tank which is very flexible in terms of its shape and it can be bolted onto the side of any existing fish tank in accordance with the above description. The triangular shaped filters, shown in the drawings, are one that optimizes the use of floor space in a fish hatchery having circular tanks. The most optimal shape of fish tank is generally accepted to be the circular tank which can be various diameters and depths. If there is a row of circular tanks in a building, between each tank there is a triangular space on each side of the tank which is basically waste space. Applicant has designed a filter which could occupy that conventional waste space and therefore not increase the capital costs to the hatchery operator of having to build a customized area or re-design his facility to accommodate the filters. The above design, susceptible to modular construction, uses the wall of the fish tank so it cuts down material costs. Further, because it is directly attached to the tank side, interconnection with valves, fittings and pipes is limited. To interconnect the preferred system, screens and openings 150, 152 are simply cut through the side of the fish tank 10 at the bottom and the air lift pumping return line is connected to the spraybar 24 above the waterline at the top. Depending on the side of the tank and the space available, there may be any number of small filters or a couple of large filters or one very large filter attached to the tank. By attaching two or more filters, of a smaller size rather than one large one, it permits better optimization of flow in a tank because waste water is removed at more than one point and clean water is re-introduced at more than one point. This gives more uniform water quality in the fish tank.

The applicant's system lends itself to a number of different configurations depending on the hatchery whether it is a retrofit situation or whether it is a new facility. Because the filter design is very compact and has been reduced to few basic fittings, it can be reproduced very inexpensively and mass produced with conventional plastic or metal forming technology and therefore the cost of manufacturing the system is quite low. The pumping and aeration systems are all air driven and run by one central air blower with automated back-up so that actual hardware and technology associated with each module is actually very low and the capital cost is very low. By attaching the filter directly to the side of the tank or placing it inside and having the water level in the filter tank and in the fish tank at the same level (because they are directly interconnected), the energy required to pump the water from the filter tank into the fish tank is extremely low. In applicant's situation, most of the water is simply recirculated between the fish tank and the filter chamber within the module. Because the water levels are the same, there is no lifting of water between the system components. Energy is expended only to push the water from one chamber to the next.

VARIATIONS

As previously noted, many modifications and variations in the filtering system are possible within the spirit of the invention and some examples are herein described. It should be noted that within the above description and the following description, structural support members have been omitted for reasons of clarity.

FIG. 2 illustrates a Swedish "style" tank 12 having a squarish configuration with rounded corners 14. One simple variation of the filter system is to install at least one corner partition 200 so that a filter system 30a is provided. (System 32 would be identical.) Shown schematically are partitions 140a and 142a thereby defining waste water chamber 144a and 146a and filter chamber 148a. Appropriate screened holes 150a and 152a in partition 200 are provided adjacent the bottom so that water with high concentration of dissolved wastes will flow into chambers 144a and 146a over the tops of respective partitions 140a and 142 into filter chamber 148a. Filter chamber 148a will include air bubble manifold 96a (in dotted line) and screened water outlet manifold 84a, both appropriately configured to provide a bubble wash of the sides of chamber 148a and a filtered water outlet, which will not be plugged by biofilter pellets. Other components to complete the system, but which have not been shown, and their appropriate locations, will be appreciated. Further, it will be apparent to those skilled in the art, in light of the previous description, how applicant's filtering system may be easily incorporated into an existing Swedish "style" tank. Of course, with a new Swedish style tank, the filtering system partitions 200 and the like would be incorporated directly into tank 12 during its manufacture Further, it will be appreciated that from 1 to 4 filtering tanks 30a could be incorporated into fish tank 12, keeping in mind the earlier comments that two or more smaller filters, rather than one large one, generally permits better optimization of filtered water circulation in a fish scale units since it incorporates features of the "Swedish" style tank and circular tank designs. The square shape is used with the biofilter subdivided into two or four units in the corners of the tank. This provides benefits of floor space optimization with the efficiency of circular or near circular fish tank shape. The internal partition walls 200 provide bracing for the straight external walls and benefits are achieved in savings of materials and fittings because the tank walls are shared. Indeed it will be appreciated that modular design of the tank 12 is possible with four modules of fiberglass being constructed, each with an outside corner and biofilter partition molded as a unit and capable of being sealingly secured together and to a prefabricated panel floor for the tank. This sectional or modular approach will facilitate transportation and installation.

Figures 9, 10:
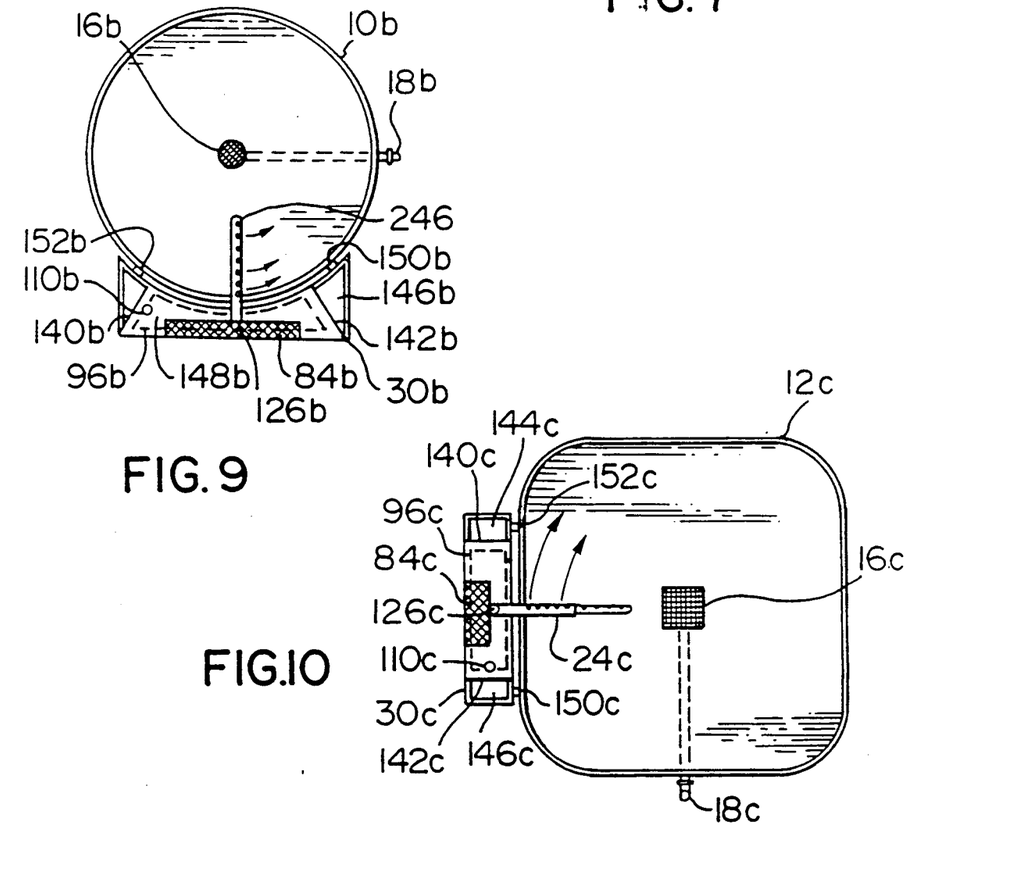
FIG. 9 is a plan view of a circular tank similar to that shown in FIG. 1 but showing a biofilter system according to the invention with the biofilter tank of a stand-along configuration.
FIG. 10 is a plan view of a "Swede" style tank similar to that shown in FIG. 2 but showing a biofilter system according to the invention with the biofilter tank of a standalong configuration.

Further, it will be appreciated that the filter system could be installed in a stand alone, separate tank arrangement and FIGS. 9 and 10 illustrate schematically, variations in tank location in conjunction with circular fish tank 10b and Swedish style fish tank 12b. Obviously it would be possible to use part of the outside wall of tanks 10b and 12b in the manner set forth before in conjunction with FIGS. 1, 6, 7 and 8, if desired.

Partitions 140b, 142b (FIG. 9) and 140c, 142c (FIG. 10) respectively divide tanks 30b and 30c into waste water chambers 144b, 146b and 144c and 146c. Screened conduit flow connections 150b, 152b and 150c, 152c are respectively provided between tanks 10b and 10c and the respective chambers 144b, 146b and 144c, 146c. Filter chambers 148b and 148c contain bubble manifolds 96b and 96c and filtered water outlet manifolds 84b and 84c are configured in relation to the shape of the respective filter chambers 148b and 148c to provide the appropriate side wall bubble wash and a filtered water outlet which is not plugged by pellets. The connections of other components such as air pipes 110b, 110c to bubble manifolds 96b and 96c respectively and air conduits 126b and 126c respectively to effect the air lift pumps will be configured to conform to the particular design and will be obvious to those skilled in the art in light of the previous disclosed embodiments. Although tanks 30b and 30c are shown separate but in close proximity to tanks 10b and 12b, tanks 30b and 30c could be remotely located, if necessary, provided appropriate liquid flow communication components are used.

Figures 11, 12, 13, 14:
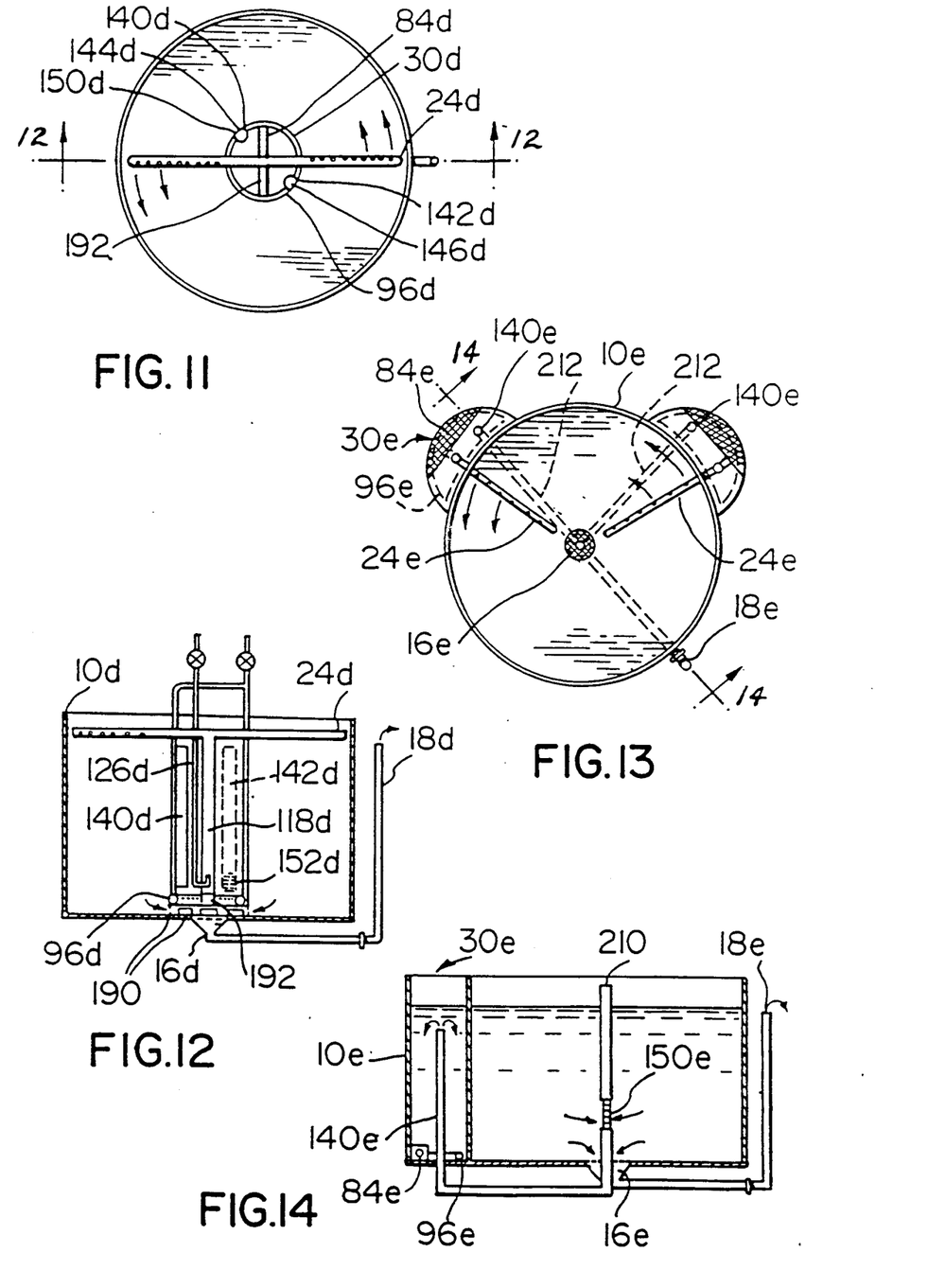
FIG. 11 is a plan view of a circular tank including a biofilter system according to the invention with the biofilter tank concentric with the culture tanks.
FIG. 12 is a schematic sectional view taken along line 12—12 of FIG. 11.
FIG. 13 is a plan view of a circular tank including a biofilter system according to the invention with biofilter tanks of different configuration.
FIG. 14 is a schematic sectional view taken along line 14—14 of FIG. 13.

FIGS. 11 and 12 provide schematic details of a configuration option wherein a concentric cylindrical filter tank 30d is installed in the center of fish tank 10d, tank 30d has bottom floor 78d spaced above the bottom of fish tank 10d. Slots 190 permit solid wastes to flow to drain 16d under floor 78d. Although not specifically shown, circumferentially spaced slots 190 can be formed such as to assist in directing the movement of solids to drain 16d as a result of the circular water flow pattern in tank 10d. Slots 190 can be of a fixed size or made adjustable in size by sliding covers (or other means obvious to those skilled in the art) in order to vary the width of the slots. This accommodates use of the filtering unit for fish of different sizes. Screens 150d and 152d are provided adjacent the bottom of filter tank 30d in order to provide for the flow of dissolved waste water into chambers 144d and 146d defined by partitions 140d and 142d respectively, which partitions, are closed at their bottoms and secured to the inside surface of filter tank 30d. (It will be appreciated that a single concentric partition could be used as an alternative.)

Filter chamber 148d includes generally circular aeration bubble manifold 96d which configuration conforms to the peripheral configuration of tank 30d. Air pipe 110d is split into two vertical portions to feed air to opposite sides of bubble manifold 96d to enhance equalization of pressure therein.

In this embodiment, filtered water outlet manifold 84d is diametrically arranged and may consist of a horizontally disposed pipe connected to the bottom of vertical conduit 118d. Manifold 84d has a diameter similar to conduit 118d and has a plurality of apertures in or has a screened upper surface to permit water to flow into the manifold 84d and to conduit 118d. In order to prevent pellets from clogging manifold 84d, a pipe 192 extends through conduit 84d and is in flow communication with air bubble manifold 96d. Holes in the upper surface of pipe 192 are located only under the screened or apertured portion of manifold 84d and the number, size and spacing of the holes or apertures in pipe 192 is such as to permit only sufficient air to escape to maintain pellets off manifold 84d. The flow of gas from pipe 192 is not intended to fluidize pellets in the chamber. As an alternative pipe 192 could be comprised of two spokes with closed off inner ends radiating inward from air bubble manifold 96d. Obviously as a further alternative, pipe 192 could be isolated from air bubble manifold and have its own valve controlled inlet air line to regulate air flow for the purposes intended. Although partitions 140d and 142d are preferred in order to specifically direct water with dissolved wastes to the top of the chamber 30d, the partitions could be omitted since the bubble wash tends to cause such water entering through openings 152d to rise to the top without bypassing the system by directly flowing to outlet manifold 84d.

Water conduit 118d and air conduit 126d provide an effective air lift pump to carry filtered water to spraybar 24d.

The configuration and operation of filter tank system 30d is in principle the same as previously described systems. The design and configuration of this embodiment with a slotted base support for tank 30d allows placement of the filter unit 30d directly into any existing fish tank whether circular or of the "Swede" style, without modification of the fish tank 10d. It will further be appreciated that with detachable means securing fish tank 30d to tank 10d, the whole unit or tank 30d may be removed to facilitate easier cleaning of both tanks. The filter tank unit 30d could be cleaned and used in some other tank 10d while repairs or maintenance is performed on the previously used fish tank.

It will be appreciated, as an alternative to the slotted base configuration shown in FIGS. 11 and 12, that a solid base support could be used if drain 16d is located radially outwardly of the wall of tank 30d. Diametrically spaced drains or a circumferentially configured drain about tank 30d would be effective.

The advantage of a design such as shown in FIGS. 11 and 12 is that water of worst quality and highest waste concentrations occur at the center of the bottom of tank 10d so that the filter system 30d is removing this low quality water and ensuring the most uniform quality of water in tank 30d.

Another alternative for removal of low quality water from the center is shown schematically in FIGS. 13 and 14. Tank 10e has a central solid waste drain 16e which leads to standpipe 18e which controls the height of water in the tank 10e and in accordance with earlier embodiments is used to periodically flush the solid waste out of drain 16 and pipe 18. This can be effected by having a joint 22e which will allow the top of pipe 18e to be lowered below the level of water in tank 10e. The pressure head differential will cause water to flow out of the top of pipe 18e and carry with it waste solids in drain 16e. Only water sufficient to flush out the collected solid waste is withdrawn and dumped.

Concentric with drain 16e is a standpipe 210 having screening apertures 150e therein above drain 16e whereby water with dissolved waste is withdrawn and piped to filter tank 30e. Pipe 140e in tank 30e acts in the same manner as chambers or ducts 144, 146 in FIG. 8 to transfer waste water to the top of filter chamber 148e thereby having the waste water flow countercurrent to air bubbles for reasons as previously set forth. The various components to provide a bubble wash of the sides of tank 30e and a filtered water outlet manifold, operating similarly to those previously disclosed, would be incorporated into tank 30e.

Accordingly, it will be apparent that various modifications and variations are possible with applicant's invention in that it is adaptable to fish tanks of various configurations. The system is also very adaptable to being incorporated in such tanks when they are originally being manufactured and installed or as a retrofit system to existing fish culture tanks.

Further, it will be appreciated that applicant's invention is not limited to aquaculture systems but can be equally adapted for use in other water purification systems and other systems wherein the culture of microorganisms to treat dissolved elements in a liquid is employed. Applicant's pellets may be used in non-aquaculture systems such as biological or chemical processes. By way of further example and noted previously in this application, applicant's pellets may be used in an anaerobic process in the production of methane, the fluidizing medium being methane gas. The pellets are adapted for use in any environment created to enhance bacteria growth where there is a desire to maximize surface area per unit volume on an ongoing basis in the process. They may also be used in the fermentation process in the production of alcohols.

A particular preferred system of the invention is shown in FIGS. 15, 16, 17 and 18 which provides a simple structure wherein the biofilm carrying media are of substantial neutral buoyancy in a circulatory system and the bed is stirred by fluid forced upwardly within a central baffle toward an outlet manifold having a screen cone-shaped configuration. The continual contact of the media with the screen minimizes biofilm build-up thereon and causes the media to further scour itself as a result of contact with the screen. The circulatory flow is down the outside of the central baffle wherein the inlet for waste liquid to the system occurs.

More particularly the filter device of FIGS. 15-18 is essentially a stirred chamber of low density filter media such as the plastic pellets heretofore described which support bacterial growth. The media pellets are approximately neutrally buoyant in the fluid to be treated. A stirring action is created to ensure maximum uniform contact between the media and the filtrate. The stirred circulating flow of the fluid pellet mixture can be induced by injected air in aerobic treatment processes or by selected gases in non-aerobic treatment processes. The circulating flow could also be induced by pumped fluid injection.

Figure 15:
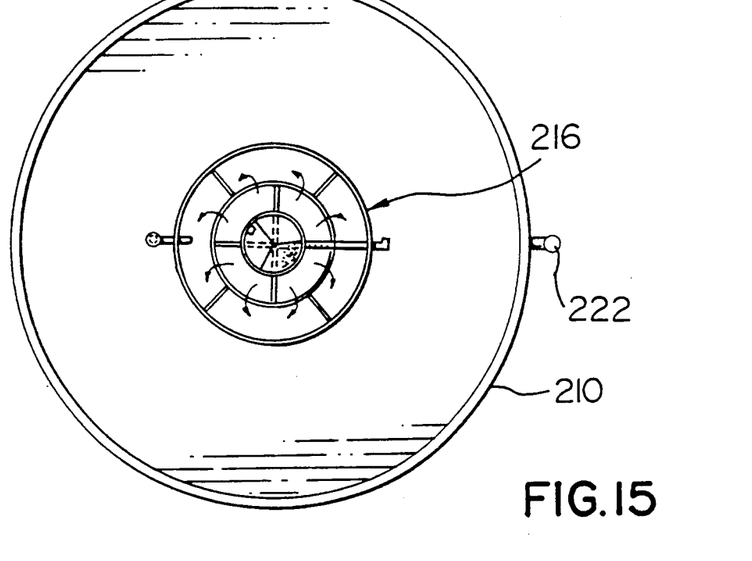
FIG. 15 is a schematic plan view of a tank containing fluid to be filtered and showing a particularly preferred filter device utilizing the biofilter pellets of this invention.
Figure 16:
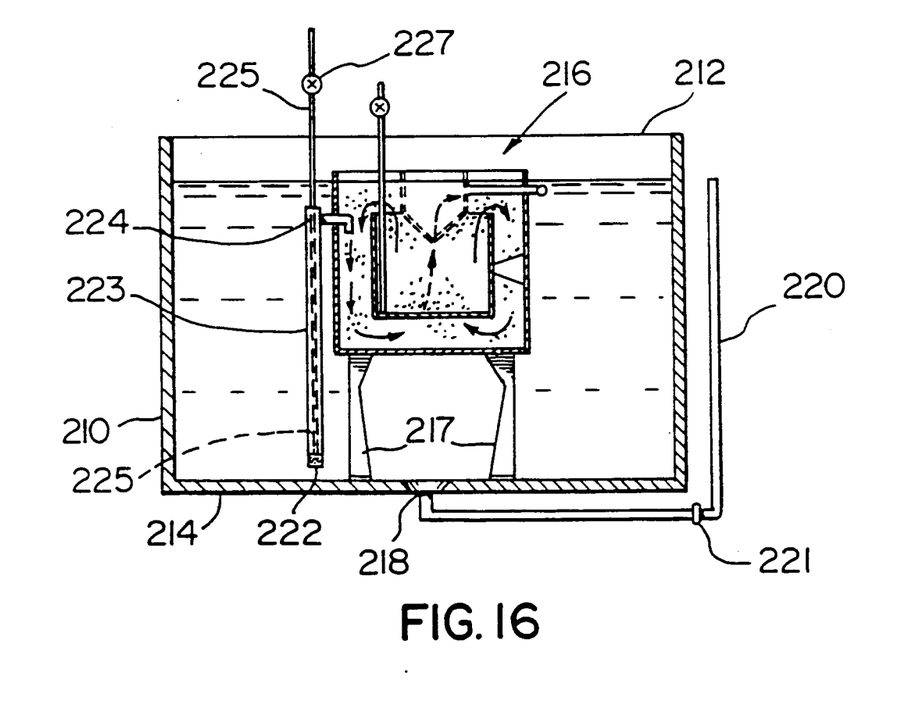
FIG. 16 is a schematic elevational view of the tank of FIG. 15.

To more particularly illustrate the operation of the system of FIGS. 15-16, an aerobic water treatment system (e.g. nitrification) with circulation induced by air injection is now described.

Tank 210 in FIGS. 15 and 16 represents a tank adapted to contain liquid to be purified, the purification being in the form of nitrification of the water. Typically, but not limited thereto, tank 210 could be a fish culture tank of the type disclosed earlier in this application.

Tank 210 has an open top 212 and closed bottom 214 and within the tank is a filter device generally designated as 216. In a fish culture application, filter device 216 would be supported above bottom 214 of tank 210 by supports 217 and the usual central, solid material drain 218 would be located below bottom 214 and includes stand pipe 220 selectably rotatable about joint 221, which construction is well known in the art and illustrated in earlier embodiments herein. Although shown concentrically with tank 210, it will be appreciated that filter device 216 could be located elsewhere within the tank 210. Further, it will be apparent that the device 216 can be located outside tank 210 with appropriate fluid connections therebetween.

Liquid to be filtered is withdrawn from adjacent the bottom 214 of tank 210 through screened end 222 of vertical conduit 223 which conduit has a "T" junction 224 leading into filter device 216. Within conduit 223 is conduit 225 extending to adjacent screened end 222 thorugh which conduit 225, air from an appropriate source (not shown) and flow controlled by valve 227, is conveyed to provide an air pump to filter device 216 for liquid to be treated.

As previously noted however, device 216 is not limited to its application to fish culture but is generally applicable to any aerobic treatment process in which denitrification of water is desired or to non-aerobic treatment processes.

Figure 17:
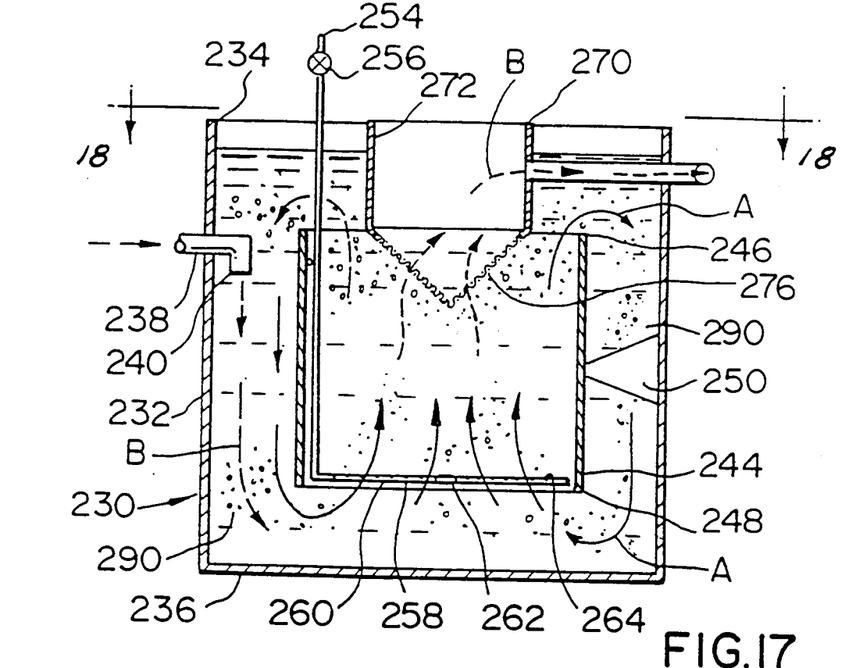
FIG. 17 is an enlarged sectional view schematically showing a particularly preferred filter device.
Figure 18:
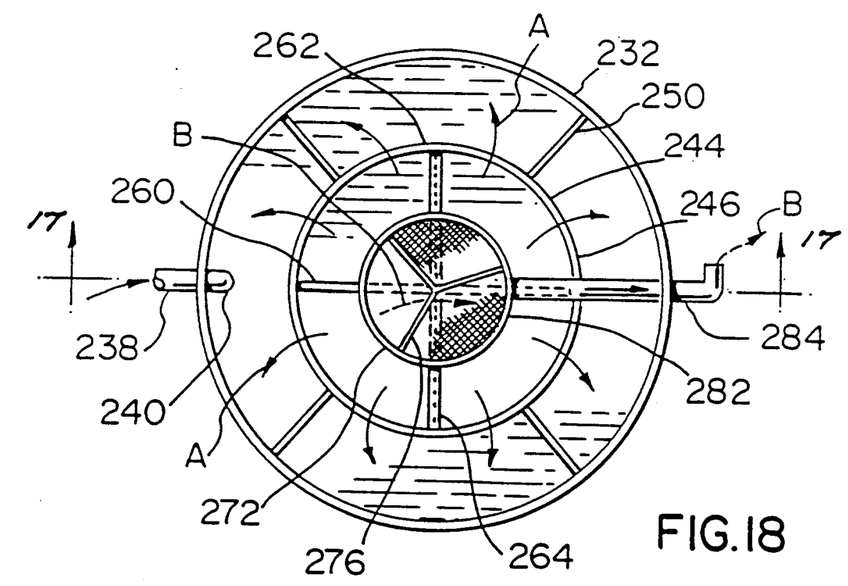
FIG. 18 is a plan view schematically showing the filter device of FIG. 17.

Turning in particular to FIGS. 17 and 18 which are enlarged schematic sectional and plan views of filter device 216, filter device 216 includes outer chamber 230 which has wall 232, open top 234 and closed bottom wall 236. Although shown circular, chamber 230 is not restricted to any particular cross-sectional configuration.

Through an upper portion of wall 232 is inlet water manifold or pipe 238 extending from "T" 224 and having a downwardly directed outlet 240 adjacent the inner periphery of wall 232. Within chamber 230 and concentric therewith is cylindrical wall or baffle 244 open at the top 246 and bottom 248. The top 246 of baffle 244 is slightly above the plane of inlet pipe outlet 240 and the bottom 248 of baffle 244 is above the bottom chamber wall 236. Baffle 244 may be supported within chamber 220 by any suitable means such as peripheral supports 250. Foot supports (not shown) could also be used provided they do not impede flow of fluid and pellets as hereinafter more fully described.

Air pipe 254 brings air under pressure from an appropriate source (not shown), the air flow being regulated by valve 256. Pipe 254 extends vertically into chamber 230 within the confines of baffle 244 and then extends horizontally, forming air diffuser manifold 258. Manifold 258 is shown to have a "cross" configuration with conduits 260 and 262 at right angles. The upper portions of the conduits 260 and 262 having apertures 264 allowing air to escape.

Concentric with chamber 230 and baffle 244 is outlet water manifold 270 having wall 272, open top 274 and a sloped screened bottom 276. Supports 278 secured to wall 272 slope downwardly to join at point 280 and support screen 282. The slope of screened bottom 276 may be from about 30°-60° but preferably about 45°.

Water outlet pipe 284 extends from manifold wall 272 through chamber wall 232 to remove water from the filter device and return it to the system (e.g. fish culture tank) and pipe 284 may have a curved end 286 to direct the outflow in a desired direction.

Shown schematically in FIG. 17 are a plurality of pellets 290 which move as shown by solid arrows A. Dotted arrows B show movement of water through the system.

In operation, the filter device, as previously noted, is essentially a stirred chamber of low density plastic pellets 290 (approximately $\frac{1}{4}''$ diameter $\times \frac{1}{8}''$ thickness of the type as more fully disclosed earlier in this application) which pellets 290 support bacterial growth and are approximately neutrally buoyant in the fluid to be treated, e.g. water.

Air bubbles injected through air manifolds 260/262 at the level of the bottom 248 of the central cylindrical baffle 244 induce an upward flow of pellets and water mixture in the central column defined by baffle 244. The pellet/water mixture is drawn down the outside of the central cylindrical baffle 244, i.e. between chamber wall 232 and baffle 244, passes under the bottom 248 of the baffle 244 and then rises again up the center of baffle 244, completing the cycle. The flow is continuously maintained.

The volume of pellet/water mixture within the central zone defined by the cylindrical baffle 244 is approximately 50% of the volume between the baffle 244 and the filter chamber wall 232. This results in similar respective upward and downward pellet/mixture flows and efficient filter operation.

Water to be treated preferably enters the filter chamber 230 at the periphery, through inlet pipe 234 where it is mixed with the downflowing stream of pellets and water, (arrows A). This prevents short circuiting of flow directly out of the filter chamber through the outlet manifold 270. Water can enter at one or at multiple peripheral points such as input 232.

The air injected can be injected through any type of diffuser 258 or sparger system. The shape or configuration of the air injection manifold is not critical, however it is desirable for efficient operation and uniform upward pellet/water flow that injected air be relatively uniformly distributed across the plane of the base of the central baffle 244. The diffuser 258 can also consist of a circular perforated air sparger running around the bottom 248 inside perimeter of the cylindrical baffle 244, as shown in earlier embodiments herein.

The outlet or water collection manifold 270 has solid cylindrical side walls 272 and a screened cone-shaped bottom or base 276 (with approximately a 45° slope being preferred). The screened base is located at the top center of the cylindrical central baffle 244 so that rapidly rising pellets 290 continually impact on the screen whereby screen 282 is continually scoured clean of any accumulating fine particulates or biofilm which would otherwise restrict outward flow of treated water. The sloped or cone-shaped bottom 276 prevents pellets 290 (i.e. filter media) from being drawn and held against the screen which also would block outward flow. The pellet/water mixture in the zone of cone shaped bottom 276 is rising rapidly upward and additionally is being drawn radially outward to the periphery of the filter 230. The turbulence and direction of flow effectively keeps filter media (pellets 290) from accumulating on the screen 282.

The continual scouring action of the pellets 290 on the screen 282 not only cleans the screen but also scrubs excess biofilm from the pellets 290 thereby preventing excess accumulation. An optimal thin layer of biofilm is therefore obtained. Excess biofilm particles freely pass through the screen with the effluent flow. The system therefore is self cleaning and maintenance free. A very uniform bacterial colony is therefore established which operates with very high efficiency per unit volume of filter.

Applicant has provided a filter device which is of the biofilm fluidized stirred bed type but which is not "depth" dependent. There is no critical height-to-width ratio with respect to the filter device relative to the particle or pellet size. The cooperation between pellets and a screened type of filter system is not limited to small prototype operations but provides a realistic synergistic device in which the pellets are of a small enough size which provides effective biofilm processing but yet are not so small that practically sized screens cannot be used to retain the filter media (pellets) totally within the system. Thus expensive separation means for handling elutriation of biofilm bearing media is not required. Further applicant provides a cost effective filter media, very inexpensive to manufacture and one usable in a system which promotes not only self scouring of the media but also reduces and eliminates excess build up of biofilm on screened outlet means.

By way of example, in a system such as illustrated in FIGS. 15-18, air flow of about 5 cubic meters per minute per cubic meter of filter volume was found sufficient to fluidize pellets, aerate the water and provide sufficient oxygen to promote biofilm growth. A volume of from about 50% to 65% pellets to volume of the chamber was appropriate. The flow through the system can be controlled by the air pump and as will be appreciated by those skilled in the art, the slower the flow, the greater is the removal of toxic wastes, whereas, the greater the flow, the less removal of toxic wastes per flow through. The more frequent the latter flow however results in increased flow through circulation in the overall closed system. It will be appreciated therefore that the degree of removal of toxic waste in the system can be simply controlled by the flow rate (pumping rate) through the system. The stirring or fluidizing action can then be used to simply provide good circulatory stirring of the filter media in the desired stirred flow path.

Accordingly, although preferred embodiments and aspects of the invention have been disclosed, applicant's invention is not limited to such preferred embodiments and aspects but encompasses all modifications and variations commensurate with the scope of the claims herewith.

I claim:

1. Apparatus for use in association with a system involved in the processing of liquid having dissolved elements with microorganism culture and utilizing the fluidization of pellets, comprising:

wall means defining a processing chamber adopted for processing a liquid with dissolved wastes by the fluidization of pellets with microorganism growth thereon, said wall means including a bottom and side wall means;

said chamber including first means for permitting introduction of said liquid to said chamber;

means adjacent said bottom for providing a fluidizing wash of said side wall means sufficient to cause fluidization of pellets used in said system within said chamber; and said chamber including second means for removing processed liquid therefrom, said second means including an outlet manifold adjacent said bottom, and including means preventing clogging of said outlet manifold by pellets used in said system, said means preventing clogging of said outlet manifold including gas bubble generating means associated with said outlet manifold.

2. The apparatus of claim 1 wherein said first means includes duct means to direct liquid to be processed to the top of said chamber.

3. The apparatus of claim 1 wherein said gas bubble generating means includes said gas bubble manifold.

4. The apparatus of claim 1 wherein said second means includes air lift pump means associated with said outlet manifold.

5. The apparatus of claim 1 wherein said side wall means is adapted for connection with a wall of a tank to define said chamber, said means for providing a gas bubble wash includes means to provide a gas bubble wash of said tank wall.

6. The apparatus of claim 1 wherein said first means includes duct means to direct liquid to be processed to the top of said chamber, said gas bubble generating means includes said gas bubble manifold and said second means includes air lift pump means associated with said outlet manifold.

7. A system for use in association with a liquid purification system including a tank having walls and containing a liquid having toxic dissolved wastes, said system comprising:

said side wall means and a bottom wall defining a treating chamber;

first flow communication means between said tank and said chamber for conveying liquid to be treated from said tank to said chamber;

means in said chamber for providing a bubble wash of the side wall means of said chamber;

pellet means within said chamber, said pellet means adapted to fluidized motion within said chamber through movement of liquid and said bubble wash, said pellets being constructed. such as to allow growth of a film capable of converting said toxic dissolved wastes in said chamber into non-toxic forms;

second flow communication means between said chamber and said tank for conveying treated liquid from said chamber to said tank, said second flow communication means includes outlet manifold having a screen and adjacent the bottom of said chamber for removing treated liquid therefrom, said outlet manifold being constructed and located in said chamber whereby at least a part of said bubble wash exists through the screen of the outlet manifold whereby pellets are prevented from adhering to said screen by bubbles exiting from the screened manifold into said chamber.

8. The system of claim 7 wherein:

said first flow communication means includes duct means for conveying liquid containing a relatively high concentration of dissolved wastes from said tank to the top of said chamber.

9. The system of claim 8 wherein said side wall means and said duct means include portions of the walls of said tank.

10. The system of claim 7 wherein said means for providing a bubble wash of the side wall means of said chamber comprises a gas bubble manifold contiguous with the bottom wall and side wall means of said chamber and having aperture means to provide an upwardly moving bubble wash of said wall means when gas exits from said apertures.

11. The system of claim 7 wherein said second flow communication means further includes a conduit from said outlet manifold to a spraybar associated with the top of said tank, and air lift pump means associated with said conduit for pumping water from said outlet manifold to said spraybar.

12. The system of claim 7 wherein said chamber is within said tank at a location of high concentration of dissolved wastes, and means for supporting said chamber so as not to interfere with solid waste removal from said tank.

13. The system of claim 7 wherein said tank is of squarish configuration and said chamber is located in one corner of said tank, said side wall means including a partitioning wall across said tank corner.

14. The system of claim 13 wherein said first flow communication means includes ducts in flow communication with said tank and within said chamber.

15. The system of claim 7 wherein said first flow communication means includes a first standpipe within said tank at a location of high concentration of dissolved waste, and a second standpipe within said chamber in flow communication with said first standpipe to convey untreated water to adjacent the top of said chamber.

16. The system of claim 15 wherein said tank walls include a bottom having screened outlet means for removing solid wastes from the tank, said first standpipe located adjacent said screened bottom outlet means and extending upwardly in the tank, said first standpipe having screened inlet means above the bottom of said tank to convey water to be treated to said second standpipe.

17. The system of claim 7 wherein said side wall means defines a chamber entirely separate from said tank.

18. In a water treatment system wherein dissolved wastes are removed from water in a tank and solid wastes are removed separately from the tank;

a treatment chamber associated with said tank and containing water and a plurality of pellets therein, which pellets are such as to permit biofilm growth thereon;

means for conveying water to be filtered at a location in the tank having a high concentration of dissolved wastes from said tank of the top of said chamber;

means for fluidizing said pellets and aerating said water in said chamber whereby biofilm formed on the pellets is in growth effective contact with water and air in said chamber;

means for withdrawing treated water from said chamber including outlet manifold means adjacent the bottom of said chamber and means for conveying the removed treated water to the top of said tank;

said outlet manifold means having screen means and associated with at least a part of the means for fluidizing said pellets and aerating said water whereby pellets are prevented from clogging said screen means;

means for selectively flushing solid wastes from said tank; and means for introducing make-up water to said system to compensate for water loss due to said flushing.

19. The water treatment system of claim 18 wherein said system treats cultured water in an aquaculture system, said means for conveying water to said chamber including means for conveying water from said tank at a location having a high concentration of dissolved wastes to the top of said chamber, and said means for withdrawing treated water including means for removing treated water from the bottom of said chamber and conveying the treated water to the top of said tank.

20. The system of claim 18 wherein said tank has a bottom and said means for selectively flushing solid wastes comprises a screened outlet adjacent the center of the bottom and a laterally pivotal standpipe exterior of said tank in flow communication with said bottom screened outlet.

21. The system of claim 20 wherein the treatment chamber is within said tank at a location of high concentration of dissolved wastes and means for supporting said chamber so as not to interfere with solid waste removal from said tank bottom screened outlet.

22. The system of claim 20 wherein the treatment chamber is outside said tank and said means for conveying water to be treated from said tank includes a first standpipe within said tank at a location of high concentration of dissolved waste and a second standpipe within said chamber in flow communication with said first standpipe to convey untreated water to adjacent the top of said chamber and said means for selectively flushing solid wastes from said tank including screened outlet means on a bottom wall of the tank and said first standpipe is located adjacent said screened outlet and extends upwardly therefrom, said first standpipe being screened inlet means above the tank bottom to convey water to be treated to said second standpipe.

23. Apparatus for use in association with a system involved in the processing of liquid having dissolved elements with microorganism culture and utilizing the fluidization of pellets, comprising:

wall means defining a processing chamber adapted for processing a liquid with dissolved wastes by the fluidization of pellets with microorganism growth thereon, said wall means including bottom and side wall means;

means for permitting introduction of liquid to be treated to said chamber;

annular baffle means having a bottom and top and supported within said chamber spaced from said bottom and side walls such that said baffle means defines in cooperation with said bottom and side wall means a vertical, circulatory flow path;

means adjacent the bottom of said baffle means for providing fluidizing movement of the liquid within the chamber sufficient to cause fluidization of said pellets in said flow path;

outlet manifold means having a screened portion adjacent the top of said baffle means, said screened portion sized and configured such that fluidized pellets continuously scour said screen by momentary impact therewith;

said outlet manifold means further including means for removing processed liquid that has passed through said screened portion.

24. The apparatus of claim 23 wherein said inlet means introduces liquid to be processed to adjacent the top of said chamber but below the top of said baffle means.

25. The apparatus of claim 24 wherein said outlet manifold means includes an upwardly outwardly conical shaped screened portion having an angle of from about 30–60 degrees to the axis of said chamber.

26. The apparatus of claim 25 wherein said means for fluidizing comprises a gas bubble manifold adjacent and within the periphery of the bottom of said baffle means.

* * * * *

UNITED STATES PATENT AND TRADEMARK OFFICE
CERTIFICATE OF CORRECTION

PATENT NO. : 5,055,186
DATED : October 8, 1991
INVENTOR(S) : James W. Van Toever It is certified that error appears in the above-identified patent and that said Letters Patent is hereby corrected as shown below:

In column 14, line 42, after "a fish", please delete "scale" and insert

--tank. The system of Figure 2 is particularly good for large scale--.

Signed and Sealed this

Twenty-third Day of February, 1993

Attest:

STEPHEN G. KUNIN

*Attesting Officer*    Acting Commissioner of Patents and Trademarks